Jan. 6, 1953     J. A. KANY     2,624,568
TORSION SPRING SUSPENSION
Filed March 14, 1946     2 SHEETS—SHEET 1
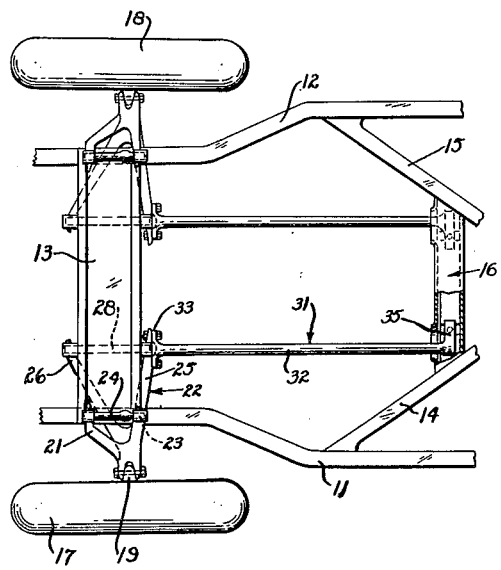
JOHN A. KANY.
INVENTOR.
BY C.C. McRae
R. G. Harris
J. R. Faulkner
T. H. Oster
ATTORNEYS.

JOHN A. KANY
INVENTOR.

Patented Jan. 6, 1953

2,624,568

UNITED STATES PATENT OFFICE 2,624,568

TORSION SPRING SUSPENSION

John A. Kany, Berkley, Mich., assignor to Ford Motor Company, Dearborn, Mich., a corporation of Delaware Application March 14, 1946, Serial No. 654,421

7 Claims. (Cl. 267—57)

1

This invention relates generally to a vehicle suspension and more particularly to a vehicle suspension of the torsion spring type.

The present invention comprises a further improvement of the torsion spring suspension disclosed in the copending application of John J. Wharam and Jerome J. Felts, Serial No. 643,104, filed January 24, 1946, now Patent No. 2,561,548, issued July 24, 1951. In the said copending application each front wheel is independently mounted upon a pair of vertically spaced wishbone suspension arms pivotally connected at their inner ends to the vehicle frame and at their outer ends to a wheel carrier upon which the road wheel is mounted. A longitudinally extending torsion spring in the form of a bar is provided for each front wheel suspension and is arranged in axial alignment with the axis of the pivotal connection between the lower suspension arm and the frame. The forward end of the spring is upset and is bolted to the lower suspension arm on opposite sides of the pivotal axis, and the rearward end of the spring is formed with an integral lever arm mounted in a socket formed in a transverse frame member.

In a torsion spring suspension of the type briefly described above, it is important that the torsion spring throughout its length be maintained in axial alignment with the pivotal axis of the suspension arm. If this alignment is not maintained, and the rearward end of the spring is displaced from the axis, bending stresses are introduced into the torsion spring. Although it is a relatively simple matter to insure axial alignment of the forward end of the torsion spring with the pivotal axis of the adjacent suspension arm, manufacturing variations in the vehicle frame may result in misalignment of the rearward end of the spring. In addition, such misalignment may result from deflection of the frame due to weight of the car and occupants, or from momentary frame deflection resulting from road irregularities. The resulting bending stresses in the torsion spring not only shorten the life of the spring but in addition are transmitted to the suspension system through the suspension arm. The stresses thus set up in the arm cause binding in the bearings of the suspension arm and impair the free operation thereof. Stiffness is introduced into the suspension linkage, and in addition the linkage may in time wear and become noisy as well as requiring replacement of the bearings.

It is therefore an object of the present invention to eliminate the disadvantages mentioned

2 above by providing a torsion spring suspension in which the rearward end of the torsion spring is mounted in a floating or semi-floating manner and permitted to find its natural position in alignment with the pivotal axis of the suspension arm, and to thus transmit pure torsion without bending stresses being introduced into the spring. Although the manufacturing and operational variations may result in bending of the spring in both vertical and horizontal directions, the detrimental effect of bending in a vertical direction is somewhat minimized by the flexibility of the suspension arm in this direction, enabling the latter to absorb a portion of the stress without transmitting it to the bearings. In a horizontal direction, however, the channel shaped suspension arm is relatively stiff and it is therefore of more importance that the rearward end of the torsion spring be permitted to float in a horizontal direction to eliminate these stresses. In the preferred form of the invention, therefore, bodily movement of the rearward end of the torsion spring is permitted in a substantially horizontal direction, while in a modification, movement in both a horizontal and vertical direction is provided for.

A further object of the invention is to provide a torsion spring suspension in which the rearward end of the spring is angularly adjustably mounted upon the cross frame member to permit adjustment of the riding height of the vehicle, and in which this adjustment is permitted without impairing the floating of the spring relative to the frame member.

Additional objects include reducing the cost of manufacture and assembly of the suspension system to a minimum by providing simple and easily assembled adjusting means. Strength is imparted to the cross frame member by forming it in a box section, which also facilitates the mounting of the adjusting means and the guiding of a sliding block positioned between the rearward end of the torsion spring and the frame member.

Other objects of this invention will be made more apparent as this description proceeds, particularly when considered in connection with the accompanying drawings, in which:

Figure 1 is a plan view of a front portion of a motor vehicle chassis provided with an independent torsion spring suspension for the front wheels, in accordance with the present invention.

Figure 2 is a front end elevation of the structure shown in Figure 1.

Figure 3 is an enlarged fragmentary plan view, partially in section, of a portion of Figure 1, illustrating particularly the construction of the opposite ends of the torsion spring and the attachment thereof to the suspension arm and to the frame.

Figure 4 is an enlarged cross-sectional view taken substantially on the line 4—4 of Figure 3.

Figure 5 is a vertical cross-sectional view taken substantially on the line 5—5 of Figure 4.

Figure 6:
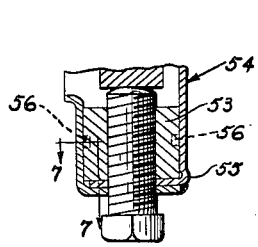
Figure 6 is a fragmentary cross-sectional view similar to a portion of Figure 5 but illustrating a slight modification.

Referring now to the drawings, and particularly to the embodiment of the invention shown in Figures 1 to 5 inclusive, the reference characters 11 and 12 indicate the side members of a vehicle frame having a front cross member 13, X-frame members 14 and 15, and an intermediate transverse frame member 16. Each of the front wheels 17 and 18 is connected to the frame by an independent suspension system of the torsion spring type. Since the suspension system for each front wheel is identical, only that for the left front wheel 17 will be described in detail.

The left front wheel 17 is mounted upon a wheel supporting member 19 which is pivotally connected to the outer ends of a pair of vertically spaced transversely extending suspension arms 21 and 22 of a V or "wishbone" shape.

The inboard end of the upper suspension arm 21 carries threaded bushings 23 which pivotally receive the opposite threaded ends of a shaft 24 mounted upon the front cross frame member 13. The inwardly extending furcations or arms 25 and 26 of the lower suspension arm 22 similarly carry threaded bushings 27 adjacent their inboard ends. The threaded bushings pivotally receive the opposite threaded ends of a shaft 28 mounted upon the front cross frame member 13. It will thus be seen that the front wheel 17 is independently mounted upon the frame, and is movable generally in a vertical plane.

A longitudinally extending torsion spring 31, in the form of a bar or rod, extends between the lower suspension arm 22 and the intermediate transverse frame member 16, and is arranged to resiliently restrain swinging movement of the front wheel suspension in an upward direction relative to the vehicle frame. As best seen in Figures 1 and 3, the torsion spring 31 has a straight body portion 32 arranged in axial alignment with the axis of the shaft 28 pivotally supporting the lower suspension arm 22, and is upset at its forward end to form an integral elongated flange 33. The flange 33 abuts the base flange of the rearward arm 25 of the lower suspension arm 22, and bolts 34 extend through aligned apertures in the base flange of the suspension arm and the elongated flange of the torsion spring to secure the torsion spring to the arm.

The construction described thus far is identical with that shown in the above-mentioned copending application, Serial No. 643,104, and reference is made to that application for a more detailed description of the construction.

Referring now to the rearward portion of the torsion spring 31, as best shown in Figures 3, 4 and 5, the rearward end of the spring is upset to form an integral lever arm 35. One end of the lever arm 35 is formed with a semi-cylindrical portion 36 concentric with the axis of the torsion spring. The opposite end 37 of the lever arm extends a substantial distance outwardly from the axis of the torsion spring.

The transverse cross frame member 16 is in the form of a box section and comprises a rear channel member 38 and a front channel member 39 telescopically engaged and welded together. The rear channel member 38 has a web 40 and flanges 41, and the front channel member 39 similarly has a web 42 and flanges 43. An elongated opening 44 is formed in the web 42 of the front channel member 39 to permit the lever arm 37 at the rearward end of the torsion spring to be inserted into the box section. A sliding block 45 is positioned between the upper flange 41 of the rear channel member 38 and the semi-cylindrical portion 36 formed at the rearward portion of the torsion spring. It will be noted that the lower surface 46 of the block 45 is arcuate and conforms in curvature to the cylindrical portion 36 of the spring.

It will be apparent that the block 45 is free to slide in a direction transversely of the vehicle frame along the lower surface of the upper flange 41 of the rear channel member 38 of the transverse frame member 16. The webs 42 and 40 of the front and rear channel members 39 and 38 respectively form guides restricting movement of the block 45 laterally of the frame member 16. Although the outboard end of the frame member 16 is inclined slightly from the horizontal, as shown in Figure 4, the construction permits floating of the rearward end of the torsion spring substantially in a horizontal transverse direction. In addition, the cooperating arcuate surfaces 46 and 36 of the sliding block 45 and the torsion spring 31 respectively permit angular movement of the rearward end of the torsion spring about its axis. As best seen in Figures 4 and 5, the lever arm 37 formed integrally with the rearward end of the torsion spring 31 abuts an adjusting bolt 47 threaded in a nut 48. The nut 48 is rectangular in cross section and is positioned between the front and rear channels 39 and 38 of the transverse frame member before the channels are welded together. Recesses 49 are formed in opposite faces of the nut 48 and are engaged by detents 50 formed in the channel members 38 and 39 to prevent horizontal movement of the nut relative to the transverse frame member 16. The bolt 47 extends through apertures in the bottom of the frame member 16, exposing the head of the bolt for easy adjustment.

The adjusting bolt 47 permits adjustment of the riding height of the vehicle to compensate for manufacturing variations and to balance the height of the opposite sides of the vehicle, and in addition permits variation of the riding height to compensate for various loads which the vehicle may be required to carry.

It will be noted from Figure 4 that the upper end of the adjusting bolt 47 is rounded to provide a point engagement with the flattened lower surface 51 of the torsion spring lever arm 37. A minimum of frictional resistance to transverse movement of the torsion spring lever arm relative to the adjusting bolt is thus present, and bodily movement of the lever arm relative to the frame member 16 is permitted.

With the present construction, the torsion spring is assembled to the vehicle by first inserting the lever arm 37 through the opening 44 in the web 42 of the front channel 39 of the transverse frame member 16, in which position the lever arm loosely engages the adjusting bolt 47 and the slideable block 45. The flange 33 at the forward end of the torsion spring is next connected to the lower suspension arm 22 of the front wheel suspension while the latter is in a downwardly extending position. Upward movement of the lower suspension arm to a position such that the upper suspension arm can be attached to the upper shaft 24 carried by the front cross frame member 13 places the torsion spring under torsional stress, and inasmuch as the rearward end of the torsion spring is mounted for floating movement in a trasverse direction, the rearward end of the spring tends to find its own natural position in axial alignment with the forward end of the torsion spring and the pivotal axis of the lower shaft 28 of the lower suspension arm 22. During operation the rearward end of the torsion spring is always free to shift laterally along the transverse frame member 16 to maintain its natural aligned position. From the foregoing it will be apparent that displacement of the rearward end of the torsion spring laterally from the pivotal axis is effectively eliminated, preventing bending stresses from being introduced into the torsion spring and transmitted to the suspension system for the front wheel. Elimination of these bending stresses removes the possibility of placing a binding load upon the threaded bushings 27 which form a bearing between the lower shaft 28 and the lower suspension arm 22. Slight misalignments in a vertical direction are absorbed by the relative flexibility of the rearward arm 25 of the lower suspension arm in a vertical direction, and are thus not transmitted to the threaded bushings 27. Not only does this construction secure a longer life for the torsion spring by the elimination of bending stresses therein, but in addition the life of the threaded bushings 27 is extended and undesirable loads upon the bushing are prevented. Such loads upon the bushing would otherwise impart stiffness to the suspension system and would also create objectionable noise.

Figure 7:
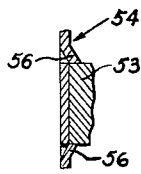
Figure 7 is a fragmentary cross-sectional view taken substantially on the line 7—7 of Figure 6.

A modification of the adjusting means for the torsion spring is shown in Figures 6 and 7, in which the nut 53 comprises a uniformly rectangular or square block which is not only cheaper to manufacture but which simplifies assembly since it can be inserted in the intermediate transverse frame member 54 with any of its side faces forward. It is thus virtually impossible for errors in assembly to occur. It will be noted that an outwardly extending bead 55 is formed in the rearward flange of the frame member 54 to provide clearance for the corner of the nut 53, since the latter is formed with square corners. This eliminates the necessity of providing a chamfer upon the nut. The nut 53 is restrained from transverse movement within the box frame member 54 by means of lugs 56 struck inwardly from the front and rear channels of the frame member for engagement with opposite sides of the nut.

Figure 8:
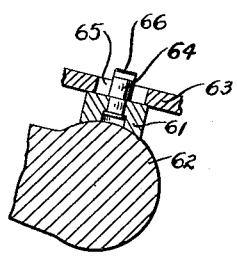
Figures 8 and 9 are fragmentary transverse cross-sectional views similar to a portion of Figure 4 but illustrating modifications.

The modification of the invention shown in Figure 8 differs from the form shown in Figures 1 to 5 in that the sliding block 61, between the lever arms 62 formed integrally on the rearward end of the torsion spring and the upper flange 63 of the transverse frame member, carries a stud 64 slideable in an elongated slot 65 formed in the flange 63. The width of the slot 65 corresponds to the width of the shank of the stud 64 thus restraining movement in a direction longitudinally of the vehicle but permitting sliding movement transversely of the vehicle along the flange 63 of the frame member. This arrangement limits the floating of the rearward end of the torsion spring between predetermined limits. The stud 64 is also provided with an enlarged head 66 which simplifies the assembly of the torsion spring with the frame member by loosely holding the block 61 upon the flange 63.

Figure 9:
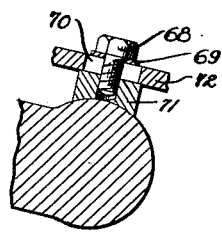

Figure 9 illustrates a further modification differing only from the construction shown in Figure 8 in that a bolt 68 and washer 69 are provided in lieu of the stud 64. The bolt 68 likewise is transversely movable within a slot 70 but in addition permits the sliding block 71 to be anchored to the flange 72 of the transverse frame member after the vehicle has been completely assembled and the torsion spring has found a natural position in which it is in axial alignment throughout its length with the pivotal axis of the lower suspension arm.

Figure 10:
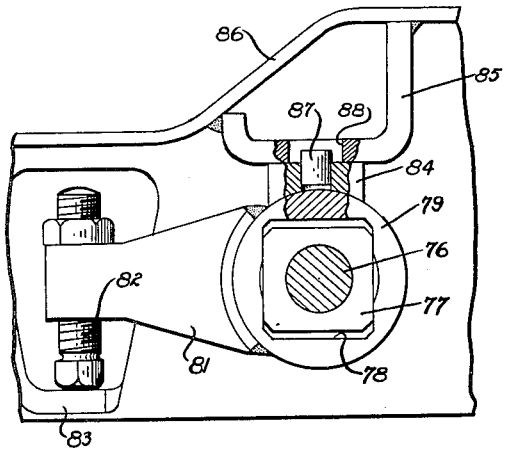
Figure 10 is a transverse cross-sectional view, partially in elevation, of a modified mounting for the rear end of a torsion spring.

A further modification of the invention is shown in Figure 10, in which the rearward end of the torsion spring is permitted to float not only in a transverse direction but also in a vertical direction as well. The rearward end of the torsion spring 76 is formed with an integral enlargement 77 of square cross section slideably received within an elongated slot 78 provided in a sleeve 79. A lever arm 81 is welded to the sleeve and carries an adjusting bolt 82 at its outer end. The head of the adjusting bolt rests upon the lower flange of a bracket 83, being slideably movable thereon. A block 84 having a lower arcuate surface is positioned between the sleeve 79 and a bracket 85 welded to the transverse frame member 86. A pin 87 is pressed into the block 84 and moves within an elongated slot 88 formed in the bracket 85 to permit floating movement of the rearward end of the torsion spring in a transverse direction. It will be apparent that with this construction universal floating movement of the rearward end of the torsion spring is provided, since the latter can shift transversely by movement of the sliding block 84 along the bracket 85 in a transverse direction, vertically by movement of the square enlargement 77 of the torsion spring within the elongated slot 78 in the sleeve 79, and axially by movement of the enlargement 77 within the sleeve. Thus, the rearward end of the torsion spring is fully floating and can find its natural position in perfect alignment with the forward end of the torsion spring and the pivotal axis of the suspension arm. All bending stresses can therefore be eliminated with this arrangement. Furthermore, since the adjusting bolt 82 is carried by the lever arm 81 of the torsion spring, rather than by the transverse frame member, the rearward end of the torsion spring will seek a true position of rest regardless of the setting of the adjustment. This eliminates the possibility of a tendency of the torsion spring lever arm to move transversely due to its inclination to the axis of the adjusting bolt during certain positions of adjustment.

Figure 12:
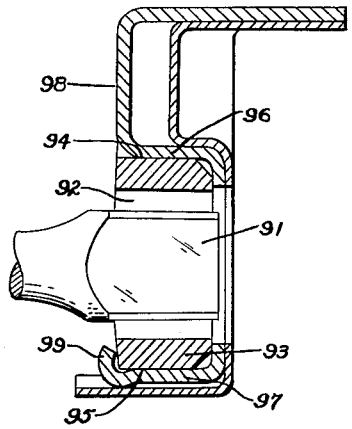
Figure 12 is a cross-sectional view taken substantially on the line 12—12 of Figure 11.
Figure 11:
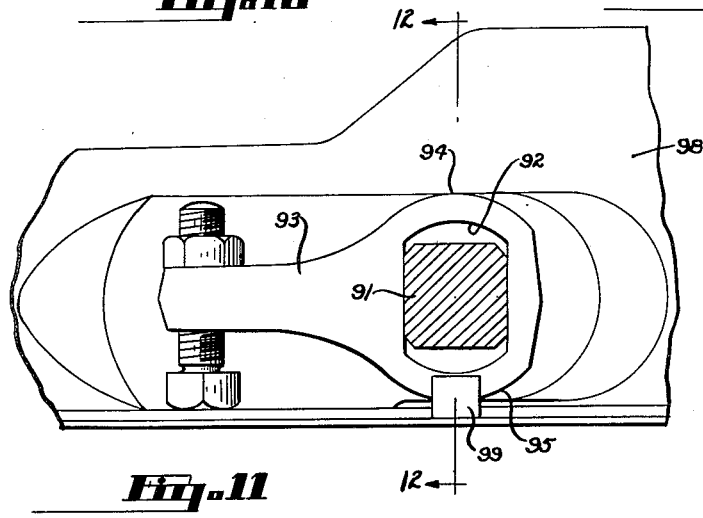
Figure 11 is a view similar to Figure 10 but showing still another modification.

Referring now to Figures 11 and 12, another modification is shown which differs from the construction shown in Figure 10 primarily by the elimination of the sliding block between the torsion spring lever arm and the frame. In this construction the squared end 91 of the torsion spring is received within an elongated slot 92 in a one piece lever arm 93 having upper and lower arcuate surfaces 94 and 95 concentric with the axis of the spring and engaging the upper side 96 of the socket formed in the transverse frame member 98. The lower flange 97 of the frame member is bent upwardly at 99 to form a lug retaining the lever arm 93 in the frame member. It will be seen that the lever arm 93 of the torsion spring is movable bodily in a transverse direction within the socket formed in the frame member 98, and that, in addition, the squared end of the spring is movable both vertically and axially in the elongated slot 92 in the lever arm.

It will be understood that the invention is not to be limited to the exact construction shown and described, but that various changes and modifications may be made without departing from the spirit and scope of the invention, as defined in the appended claims.

What is claimed is:

1. In a vehicle having a transversely extending frame member and a supporting member carrying a road wheel, a torsion spring extending longitudinally of said vehicle for resiliently suspending said road wheel, means fixedly connecting one end of said torsion spring to said supporting member, a lever arm upon the opposite end of said torsion spring, a friction member supporting said lever arm, said friction member being mounted upon said transverse frame member and restrained against vertical movement with respect thereto but movable bodily a substantial distance in a direction transversely of said vehicle, and means carried by said frame member restraining angular movement of said lever arm.

2. In a vehicle having a frame and a road wheel, means suspending said road wheel from said frame, a frame member spaced from said means, a torsion spring extending between said means and said frame member, a lever arm upon one end of said torsion spring, a block slidable upon said frame member and supporting said last mentioned end of the torsion spring for movement along said frame member, and means between the free end of said lever arm and said frame member restraining angular movement of said lever arm and torsion spring without interfering with the aforesaid movement thereof along said frame member.

3. The structure defined by claim 2 which is further characterized in that said lever arm has an arcuate surface concentric with the axis of said torsion spring, and said slideable block has a complementary arcuate surface engageable with the arcuate surface on said lever arm to permit angular adjustment of the latter relative to said frame member.

4. The structure defined by claim 2 which is further characterized in that said block is movable as a unit with said lever arm along said frame member and carries an element projecting through a slot in said frame member to guide the sliding movement of said block and lever arm, the ends of said slots forming stops limiting the sliding movement of said block and lever arm.

5. In a vehicle having a frame and a road wheel, means suspending said road wheel from said frame, a box section frame member extending transversely of said frame and comprising a pair of oppositely spacing channel members secured together, one of said channel members having an opening in its face, a torsion spring extending between said means and said box section frame member with one end of said spring extending into the interior of said box section frame member through said opening, a lever arm upon the last-mentioned end of said torsion spring within said box section frame member, a block slideable within said box section frame member and guided by the opposite walls thereof, said block being frictionally engaged by said lever arm to permit sliding movement of said lever arm and the adjacent end of said torsion spring within said box section frame member and means carried by said frame member restraining angular movement of said lever arm.

6. In a vehicle having a frame and a road wheel, means suspending said road wheel from said frame, a box section frame member extending transversely of said frame and comprising a pair of oppositely spacing channel members secured together, one of said channel members having an opening in its face, a torsion spring extending between said means and said box section frame member with one end of said spring extending into the interior of said box section frame member through said opening, a lever arm upon the last-mentioned end of said torsion spring within said box section frame member, a block slideable within said box section frame member and guided by the opposite walls thereof, said block being frictionally engaged by said lever arm to permit sliding movement of said lever arm and the adjacent end of said torsion spring within said box section frame member, a rectangular block supported within said box section frame member and held against turning by the opposite walls thereof, said second mentioned block having depressions on its opposite faces engaged by detents formed on the adjacent walls of said frame member to prevent sliding movement of said second mentioned block relative to said frame member, and an adjusting screw threadedly mounted in said second mentioned block and engageable with one end of said lever arm for angularly adjusting said lever arm.

7. In a vehicle having a frame and a road wheel, means suspending said road wheel from said frame, a box section frame member extending transversely of said frame and comprising a pair of oppositely spacing channel members secured together, one of said channel members having an opening in its face, a torsion spring extending between said means and said box section frame member with one end of said spring extending into the interior of said box section frame member through said opening, a lever arm upon the last-mentioned end of said torsion spring within said box section frame member, a block slideable within said box section frame member and guided by the opposite walls thereof, said block being frictionally engaged by said lever arm to permit sliding movement of said lever arm and the adjacent end of said torsion spring within said box section frame member, a square section block supported within said box section frame and held against turning by the opposite walls thereof, said second mentioned block having depressions on its opposite faces engaged by detents formed on the adjacent walls of said frame member to prevent sliding movement of said second mentioned block relative to said frame member, and an adjusting screw threadedly mounted in said second mentioned block and engageable with one end of said lever arm for angularly adjusting said lever arm.

JOHN A. KANY.

REFERENCES CITED

The following references are of record in the file of this patent:

UNITED STATES PATENTS

| Number | Name | Date |
|---|---|---|
| 926,685 | Thomas | June 29, 1909 |
| 2,075,041 | Kliesrath | Mar. 30, 1937 |
| 2,100,285 | Matthews | Nov. 23, 1937 |
| 2,103,590 | Lefevre | Dec. 28, 1937 |
| 2,173,974 | Leighton | Sept. 26, 1939 |
| 2,191,211 | Krotz | Feb. 20, 1940 |
| 2,346,164 | Holmstrom et al. | Apr. 11, 1944 |

FOREIGN PATENTS

| Number | Country | Date |
|---|---|---|
| 448,757 | Great Britain | June 15, 1936 |
| 767,598 | France | May 1, 1934 |
| 812,732 | France | Feb. 8, 1937 |